United States Patent [19]

Brahm et al.

[11] Patent Number: 5,606,004
[45] Date of Patent: Feb. 25, 1997

[54] LACQUER POLYISOCYANATES WITH ALIPHATICALLY AND AROMATICALLY BOUND ISOCYANATE GROUPS

[75] Inventors: Martin Brahm, Engelskirchen; Josef Pedain; Lutz Schmalstieg, both of Köln, all of Germany

[73] Assignee: Bayer Aktiengesellschaft, Leverkusen, Germany

[21] Appl. No.: 509,258

[22] Filed: Jul. 31, 1995

[30] Foreign Application Priority Data

Aug. 9, 1994 [DE] Germany ............... 44 28 107.2

[51] Int. Cl.$^6$ ............ C08G 18/76; C08G 18/79; C07D 251/34; C07C 265/02
[52] U.S. Cl. ............ 528/73; 252/182.2; 252/182.21; 252/182.22; 528/44; 528/49; 528/59; 528/67; 544/193; 544/222; 560/25; 560/26; 560/336; 560/355; 560/358; 560/360
[58] Field of Search ............ 252/182.2, 182.21, 252/182.22; 528/44, 49, 59, 67, 73; 544/193, 222; 560/25, 26, 336, 355, 358, 360

[56] References Cited

U.S. PATENT DOCUMENTS 3,280,066 10/1966 France et al. .................. 528/67
3,284,413 11/1966 Heiss ........................... 528/67
3,645,979 2/1972 Liebsch et al. ................. 528/51
4,255,569 3/1981 Müller et al. ................... 544/193
4,293,680 10/1981 Mazanek et al. ................. 528/67
4,456,709 6/1984 Richter et al. .................. 528/67
4,675,401 6/1987 Robin ........................... 544/193
5,066,689 11/1991 Patzschke et al. ................ 523/415

FOREIGN PATENT DOCUMENTS 1234972 6/1971 United Kingdom .
1244416 9/1971 United Kingdom .

*Primary Examiner*—Rabon Sergent
*Attorney, Agent, or Firm*—Joseph C. Gil; Thomas W. Roy

[57] ABSTRACT

A process for preparing liquid lacquer polyisocyanates with aliphatically and aromatically bound isocyanate groups and an NCO content of 5 to 25 wt. % by trimerizing an isocyanate component A), containing A1) 70 to 100 wt. % of diisocyanatotoluene and A2) 0 to 30 wt. % of other aromatic isocyanates and B) aliphatic lacquer polyisocyanates, optionally with prior, simultaneous and/or subsequent reaction of a portion of the isocyanate groups with an alcohol component C) having a molecular weight of 32 to 900, and optionally in the presence of D) inert solvents; the resulting lacquer polyisocyanates; and their use in coating compositions, in particular as a cross-linking agent for polyhydroxyl compounds in two-component polyurethane coating compositions.

18 Claims, No Drawings

LACQUER POLYISOCYANATES WITH ALIPHATICALLY AND AROMATICALLY BOUND ISOCYANATE GROUPS

BACKGROUND OF THE INVENTION

1. Field of the Invention

The present invention relates to a process for preparing lacquer polyisocyanates with aliphatically and aromatically bound isocyanate groups, the lacquer polyisocyanate obtained by this process and their use in coating compositions.

2. Description of the Prior Art

Coating compositions based on polyisocyanates are well known and have been disclosed in H. Wagner, H. F. Sarx, Lackkunstharze 5th ed. p. 153 et seq., Carl Hanser Verlag Munich 1971. The lacquer polyisocyanates which are used as cross-linking agents in this type of coating composition may have both aromatically and aliphatically bound isocyanate groups. The lacquer polyisocyanates are prepared in general by the modification of aliphatic and/or aromatic monomeric diisocyanates to form polyisocyanates containing isocyanurate, uretdione, urethane, allophanate and/or biuret groups, followed by removal of excess, unreacted starting diisocyanates, in particular by distillation. Lacquer polyisocyanates based on aliphatic diisocyanates have an exceptional resistance to the effects of light, while those based on aromatic diisocyanates are highly reactive and are used as hardening and cross-linking agents in quick drying two-component polyurethane coating compositions.

The preparation of lacquer polyisocyanates with isocyanurate groups by mixed trimerization of hexamethylene diisocyanate (HDI) and diisocyanatotoluene (TDI) is also known (U.S. Pat. No. 3,645,979 and DE-OS 1,954,093). In this mixed trimerization lacquer polyisocyanates are obtained after distillative removal of excess diisocyanates by thin-film vaporization, which combine the advantages of aliphatic and aromatic lacquer polyisocyanates. One of the disadvantages of the prior art process is that excess starting diisocyanate has to be removed by distillation after completion of the trimerization reaction, which exposes the resulting product to high temperatures that can cause yellowing. Another disadvantage is to be seen in the solid consistency of the resulting mixed trimer.

An object of the present invention is to provide a new process for preparing lacquer polyisocyanates containing isocyanurate groups and having aliphatically and aromatically bound isocyanate groups, in which the costly removal of excess starting polyisocyanate after the trimerization reaction is not required, and which nevertheless leads to monomer-free lacquer polyisocyanates which are liquid at room temperature. The term "liquid lacquer polyisocyanate" also includes liquid solutions of lacquer polyisocyanates, which are solid at room temperature, in lacquer solvents at a solids content of at least 60 wt. %. Since the process according to the invention does not involve costly thin film distillation for removing monomeric starting isocyanates, the production of these products can be undertaken in the presence of solvents, so that at no point in the process according to the invention are solid resins like the products from the previously disclosed prior art.

This object may be achieved with the process according to the invention described in detail below. This process is based on the surprising observation that aromatic isocyanates, in particular TDI, can be selectively trimerized in the presence of high concentrations of aliphatic isocyanate groups down to a residual content of aromatic diisocyanates of less than 0.5 wt. % to obtain virtually toohomer-free liquid lacquer polyisocyanates having aliphatically and aromatically bound isocyanate groups and an NCO content of 5 to 25 wt. %.

SUMMARY OF THE INVENTION

The present invention relates to a process for preparing liquid lacquer polyisocyanates having aliphatically and aromatically bound isocyanate groups and an NCO content of 5 to 25 wt. %, based on solids, by catalytically trimerizing A) 100 parts of an aromatic isocyanate component containing A1) 70 to 100 wt. % of 2,4- and/or 2,6-diisocyanatotoluene (TDI) and A2) 0 to 30 wt. % of one or more aromatic isocyanates other than TDI having a molecular weight of 119 to 350, wherein the percentages of A1) and A2) add up to 100 and B) 15 to 700 pads weight of an aliphatic isocyanate component containing one or more lacquer polyisocyanates having exclusively aliphatically bound isocyanate groups, a concentration of distillable, monomeric diisocyanates of less than 0.7 wt. % and a viscosity of less than 10,000 mPa.s at 23° C., optionally with prior, simultaneous and/or subsequent reaction of a portion of the isocyanate groups with C) up to 40 equivalent percent, based on the isocyanate groups of component A), of an alcohol component containing one or more alcohols having a molecular weight of 32 to 900 and optionally in the presence of D) solvents which are inert towards isocyanate groups, until the concentration of distillable, monomeric isocyanates A) has dropped to less than 0.5 wt. %, based on the weight of the total mixture.

The present invention also relates to the lacquer polyisocyanates obtained by this process and to their use in coating compositions, in particular as cross-linking agents for hydroxy-functional resins in two-component polyurethane coating compositions.

DETAILED DESCRIPTION OF THE INVENTION

Starting component A) is selected from diisocyanates A1) with up to 30 wt. %, based on the total weight of component A), of isocyanates A2). Suitable isocyanates A1) are 2,4- and/or 2,6-diisocyanatotoluene, preferably a mixture of 2,4-diisocyanatotoluene with up to 35 wt. %, more preferably up to 20 wt. % of 2,6-diisocyanatotoluene. Most preferably component A1) exclusively contains 2,4-diisocyanatotoluene.

Isocyanates A2) are selected from isocyanates with aromatically bound isocyanate groups which are different from A1) and have a molecular weight of 119 to 350. Examples include both mono and polyisocyanates such as phenyl isocyanate and 1,3- and 1,4-phenyl diisocyanate. Also suitable is 4,4-diisocyanatodiphenylmethane, mixtures of this diisocyanate with its 2,2- and/or 2,4-isomers and optionally higher homologs of these diisocyanates.

Component B) is selected from lacquer polyisocyanate having aliphatically bound isocyanate groups, an NCO content of 10 to 25 wt. %, a concentration of distillable monomers of less than 0.7 wt. %, preferably less than 0.5 wt. %, and a solvent-free viscosity of less than 10,000, preferably less than 3,500 and more preferably less then 1,200 mPa.s at 23° C. The expression "aliphatically bound isocyanate groups" is intended to also include cycloaliphatically and aralphatically bound isocyanate groups.

Lacquer polyisocyanates based on hexamethylene diisocyanate (HDI) and containing biuret, allophanate, isocyanurate, uretdione and/or urethane structures are preferably used as component B). These polyisocyanates and their preparation are described, for example, in EP-A-0,010,589 (U.S. Pat. No. 4,324,879, herein incorporated by reference), EP-A-0,377,177 (U.S. Pat. No. 4,994,541, herein incorporated by reference), EP-A-0,496,208 (U.S. Pat. No. 5,124,427, herein incorporated by reference), EP-A-0,524,500 (U.S. Pat. No. 5,235,018, herein incorporated by reference), EP-A-0,524 501 (U.S. Pat. No. 5,208,334, herein incorporated by reference), DE-OS 3,810,908 (U.S. Pat. No. 4,801,663, herein incorporated by reference), U.S. Pat. No. 3,903,127 (herein incorporated by reference) and U.S. Pat. No. 4,614,785 (herein incorporated by reference). The NCO content of the preferred HDI derivatives suitable for use as starting component B) is 17 to 24 wt. %. In addition to lacquer polyisocyanates based on HDI, analogous lacquer polyisocyanates based on other diisocyanates with aliphatically bound isocyanate groups may be used. These other diisocyanates include dodecamethylene diisocyanate, 2,2,4-and 2,4,4-trimethyl-1,6-diisocyanatohexane, 1-isocyanato-3-isocyanatomethyl-3,5,5-trimethylcyclohexane, 4,4-bis-(isocyanatocyclohexyl)-methane, hexahydro-2,4- and/or 2,6-diisocyanatotoluene, 1-isocyanato-4(3)-isocyanatomethyl-1-methylcyclohexane and p-xylylene diisocyanate. Mixtures of these polyisocyanates with HDI may also be used to prepare the lacquer polyisocyanates.

When performing the process according to the invention, 15 to 700, preferably 20 to 500 and more preferably 30 to 300 pads by weight of component B) are used per 100 parts by wt. of component A).

To increase compatibility of products according to the invention with hydroxy-functional binder components, such as hydroxy-functional polyacrylate resins, and/or to adjust the elasticity of coatings ultimately produced with products according to the invention, some of the isocyanate groups may be reacted with an alcohol component C) before, during or after the trimerization reaction.

Suitable alcohols C) are selected from alcohols having a molecular weight of 32 to 900, preferably 74 to 300. Examples include monohydric alcohols such as methanal, ethanol, n-propanol, isopropanol, methoxypropanol, the isomeric butanols, pentanols and hexanols, n-heptanol, n-octanol, n-nonanol, n-decanol, n-dodecanol, n-octadecanol and saturated and unsaturated fatty alcohols. Also suitable are polyfunctional alcohols such as ethylene glycol, diethylene glycol, triethylene glycol, dipropylene glycol, propanediol-1,2, and -1,3, butanediol-1,4 and -1,3, hexanediol-1,6, octanediol-1,8, nonanediol -1,9, decanediol-1,10, dodecanediol-1,12, octadecanediol-1,18, neopentyl glycol, 1,4-bis-hydroxymethylcyclohexane, 2-methyl-1,3-propanediol, 2,2,4-trimethylpentanediol-1,3, 2-ethyl-1,3-hexanediol, glycerine, trimethylolpropane, trimethylolethane, dimeric fatty alcohols, trimeric fatty alcohols, the isomeric hexanetriols, pentaerythritol and/or sorbitol. The average OH functionality of alcohol component C) is generally not more than 2, preferably not more than 1.2.

The amount of alcohol C) should not exceed 0.4 OH equivalents, preferably not more than 0.2 OH equivalents, per NCO equivalent in component A). Preferably, the process is performed without adding alcohol component C).

The optionally used alcohol component C) is preferably used in a preliminary reaction at 40° to 120° C. with components A) and B) to form urethane and optionally allophanate groups. It is also possible, however, but less preferable, to react alcohol component C) with only one of the components A) or B) in a preliminary reaction. Also possible, but less preferable, is reaction of alcohol component C) during or after the trimerization reaction.

The process according to the invention is either performed with no solvent or in the presence of a suitable solvent D) so that the solids content of the products according to the invention is at least 60 wt. %, preferably at least 70 wt. %. It is particularly preferred not to use solvents when solvent-free products are produced having a viscosity (23° C.) of 200 to 200,000 mPa.s, preferably 2000 to 50,000 mPa.s.

Suitable solvents D) include toluene, xylene, cyclohexane, chlorobenzene, butyl acetate, ethyl acetate, ethylglycol acetate, pentyl acetate, hexyl acetate, methoxypropyl acetate, tetrahydrofuran, dioxane, acetone, methylethyl ketone, white spirit, higher substituted aromatic compounds (such as those sold under the tradenames Solvent Naphtha, Solvesso, Shellsol, Isopar, Nappar, and Diasol), heavy benzole, tetralin, decalin, alkanes with more than 6 carbon atoms and mixtures thereof.

To perform the process according to the invention, components A), B) and optionally D) are mixed and the trimerization reaction is initiated by adding the trimerization catalyst. As previously described, either before, during or after the trimerization reaction, components A) or B) are modified with alcohols C). Trimerization takes place at a temperature of 10° to 120° C., preferably 20° to 60° C., until the amount of distillable isocyanates A) with aromatically bound isocyanate groups in the reaction mixture is less than 0.5 wt. %, preferably less than 0.1 wt. %.

When performing the process according to the invention, trimerization catalysts which are known for trimerizing aromatic isocyanates are used. The catalysts are preferably used in amounts of 0.001 to 3, more preferably 0.01 to 1 wt. %, based on the weight of component A). Suitable trimerization catalysts include Mannich bases, quaternary ammonium salts, alkali metal carbonates, tert. amines and mixtures thereof.

If the trimerization catalysts do not decompose on their own, the reaction is generally terminated by the addition of a suitable catalyst poison and optionally an increase in temperature up to 120° C., as soon as the desired degree of trimerization or the desired low monomer content has been achieved. Suitable catalyst poisons for the preferred basic trimerization catalysts are acids, such as phosphoric acid, sulphuric acid, hydrochloric acid, or acylation agents or alkylation agents such as carboxylic chlorides, dimethyl sulphate or an alkyl p-toluenesulphonate.

The products which are obtained are polyisocyanate mixtures having an NCO content cf 5 to 25, preferably 10 to 21 wt. % and a distillable starting polyisocyanate A) content of at most 0.5, preferably at most 0.1 wt. %, wherein these percentages are based on solids.

The products according to the invention are binders which may be used as one-component coating compositions curable by atmospheric moisture. They are preferably used as a cross-linking agent (binder component) in two-component polyurethane coating compositions, preferably those containing polyhydroxyl compounds as the other binder component. Suitable pokyhydroxyl compounds are the polyethers, polyesters, polyesteramides, polycarbonates, polyacrylates and polybutadienes known from polyurethane chemistry. The products according to the invention may obviously also be used in blocked form as heat-activatable cross-linking agents.

The coating compositions may also contain other known additives such as wetting agents, flow control agents, skin-preventing agents, anti-foaming agents, solvents, matting agents (such as silica, aluminum silicate and high-boiling waxes), viscosity controlling substances, pigments, colorants, UV-absorbers and stabilizers against thermal or oxidative degradation.

The coating compositions according to the invention may be used for coating any substrates such as wood, plastics, leather, paper, textiles, glass, ceramics, plaster, brickwork, metals or concrete. They can be applied using conventional methods of application such as spraying, brushing, flow-coating, pouring, immersing or by using rollers. The coating compositions may be used in the form of clear lacquers or in the form of pigmented lacquers.

The coating compositions contain the products according to the invention and the hydroxy-functional binder components in amounts sufficient to provide an NCO/OH equivalent ratio of 0.5:1 to 2:1. The coating compositions may be cured at 20° C. for few minutes to a few hours to provide high-quality coatings. If desired, the curing process may be accelerated, even when using process products according to the invention with free isocyanate groups, by increasing the temperature to up to 200° C.

In the following examples, all parts or percentages are by weight, unless otherwise indicated.

EXAMPLES

In the following examples, a 40% solution in butyl acetate of a Mannich base based on phenol and dimethylamine was used as trimerization catalyst. Preparation of the trimerization catalyst is described in Houben-Weyl, Methoden der organischen Chemie, vol. E 20 Makromolekulare Stoffe. p. 1746 (Georg Thieme Verlag Stuttgart, New York, 1987).

Example 1

To 533 g (2.7 equiv.) of a uretdione diisocyanate based on HDI and having an NCO content of 21.8%, a free HDI content of 0.25% and a viscosity (23° C.) of 170 mPa.s were added 117 g (1.35 equiv.) of 2,4-diisocyanatotoluene (TDI) and 1.34 g of the previously described catalyst. After stirring for 8 hours at room temperature an additional 1.34 g of the catalyst was added and stirring was continued for another 40 hours at room temperature until the NCO content had fallen to 19.1%. To terminate the trimerization reaction, 2.1 g of methyl p-toluenesulphonate was added to the product, which was then heated for one hour at 80° C. The product had the following characteristics:

NCO content: 19.25%
Solids content: 100%
Viscosity at 23° C.: 4400 mPa.s
TDI content: 0.09%

Example 2

410 g (2.1 equiv.) of the uretdione diisocyanate described in example 1 and 183 g (2.1 equiv.) of 2,4-diisocyanatotoluene were heated to 50° C. in a stirrer and 59 g (0.32 equiv.) of 1-dodecanol were added dropwise. Stirring was continued until the NCO content had fallen to 25% 1.6 g of the previously described catalyst solution was added and stirring was continued for another 24 hours until the NCO content had fallen to 17.5%. To terminate the trimerization reaction, 1.3 g of methyl p-toluenesulphonate was added to the polyisocyanate, which was then heated for one hour at 80° C. The product had the following characteristics:

NCO content: 17.5%
Solids content: 100%
Viscosity at 23° C.: 7000 mPa. s
TDI content: 0.35%

Example 3

566 g (2.6 equiv.) of a solvent-free allophanate/trimer based on hexamethylene diisocyanate and n-butanol and having an NCO content of 19.3%, a free HDI content of 0.3% and a viscosity (23° C.) of 300 mPa.s was prepared in accordance with EP-A-0 496 208 (U.S. Pat. No. 5,124,427), mixed 226 g (2.6 equiv.) of 2,4-diisocyanatotoluene and heated to 40° C. in a stirrer while 73 g (0.39 equiv.) of 1-dodecanol were added dropwise. After about one hour, the NCO content was 23.3%. 1 g of the previously described catalyst solution was then added and trimerization was continued for 19 hours at 40° C. until the NCO content has fallen to 15.2%. To terminate trimerization, 0.6 g of methyl p-toluenesulphonate were; added to the polyisocyanate, which was then heated for one hour at 80° C. The product had the following characteristics:

NCO content: 15.2%
Solids content: 100%
Viscosity at 23° C.: 13,000 mPa.s
TDI content: 0.09%

Example 4

186 g (0.32 equiv.) of a low viscosity trimer based on HDI (NCO and 174 g (4 equiv.) of 2,4-diisocyanatotoluene were mixed with 80 g of butyl acetate in a stirrer and heated to 40° C. Then the trimerization reaction was begun by the addition of 0.75 g of the previously described catalyst solution. After 4 hours, an additional 0.5 g of the catalyst solution was added. The desired NCO content of 16.1% was reached within 24 hours and the reaction was terminated by adding 1 g of benzoyl chloride. The reaction mixture was then heated at 80° C. for one hour. The product had the following characteristics:

Concentration: 81.7%
NCO content: 16.1%
TDI content: 0.41%
Viscosity at 23° C.: 22,000 mPa.s Example 5

Producing a clear lacquer

The polyisocyanate prepared in example 4 was mixed with a commercial polyester polyol (Desmophen 1300, available from Bayer AG, Leverkusen, OH content: 3.2%, 75% solution in butyl acetate) at an NCO/OH equivalent ratio of 1, adjusted to flow time of 20 seconds in a DIN standard 4-cup using butyl acetate, and spread onto a clean glass plate in a film thickness of 180 pm. A clear, high-gloss, coating having the following properties was produced:

Drying time: 7 hours
König pendulum hardness after 1 day: 62 s
König pendulum hardness after 8 days: 130 s
Resistance to solvents after 8 days: very good

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a liquid lacquer polyisocyanate having aliphatically and aromatically bound isocyanate groups and an NCO content of 5 to 25 wt. %, based on solids, by catalytically trimerizing
   A) 100 parts by weigt of an aromatic isocyanate component containing
      A1) 70 to 100 wt. % of 2,4- and/or 2,6-diisocyanatotoluene (TDI) and
      A2) 0 to 30 wt. % of one or more aromatic isocyanates other than TDI having a molecular weight of 119 to 350,
      wherein the percentages of A1) and A2) add up to 100 and
   B) 15 to 700 parts by weight of an aliphatic isocyanate component containing one or more lacquer polyisocyanates having exclusively aliphatically bound isocyanate groups, an NCO content of 10 to 25 wt %, a concentration of distillable, monomeric diisocyanates of less than 0.7 wt. % and a viscosity of less than 10,000 mPa.s at 23° C., optionally with prior, simultaneous and/or subsequent reaction of a portion of the isocyanate groups with
   C) up to 40 equivalent percent, based on the isocyanate groups of component A), of an alcohol component containing one or more alcohols having a molecular weight of 32 to 900 and optionally in the presence of
   D) one or more solvents which are inert towards isocyanate groups, until the concentration of distillable, monomeric isocyanates A) has dropped to less than 0.5 wt. %, based on the weight of the total mixture.

2. The process of claim 1 wherein component A) consists of 2,4-diisocyanatotoluene.

3. The process of claim 1 wherein component B) is used in an amount of 30 to 300 parts by weight.

4. The process of claim 2. Wherein component B) is used in an amount of 30 to 300 parts by weight.

5. The process of claim 1 which comprises conducting the trimerization reaction in the absence of solvents D).

6. The process of claim 2 which comprises conducting the trimerization reaction in the absence of solvents D).

7. The process of claim 3 which comprises conducting the trimerization reaction in the absence of solvents D).

8. The process of claim 4 which comprises conducting the trimerization reaction in the absence of solvents D).

9. A liquid lacquer polyisocyanate having aliphatically and aromatically bound isocyanate groups and an NCO content of 5 to 25 wt %, based on solids, which is prepared by catalytically trimerizing
   A) 100 parts by weight of an aromatic isocyanate component containing
      A1) 70 to 100 wt % of 2,4- and/or 2,6-diisocyanatotoluene (TDI) and
      A2) 0 to 30 wt % of one or more aromatic isocyanates other than TDI having a molecular weight of 119 to 350, wherein the percentages of A1) and A2) add up to 100 and
   B) 15 to 700 parts by weight of an aliphatic isocyanate component containing one or more lacquer polyisocyanates having exclusively aliphatically bound isocyanate groups, an NCO content of 10 to 25 wt %, a concentration of distillable, monomeric diisocyanates of less than 0.7 wt % and a viscosity of less than 10,000 mPa's at 23° C., optionally with prior, simultaneous and/or subsequent reaction of a portion of the isocyante groups with
   C) up to 40 equivalent percent, based on the isocyanate groups of component A), of an alcohol component containing one or more alcohols having a molecular weight of 32 to 900 and optionally in the presence of
   D) one or more solvents which are inert towards isocyanate groups, until the concentration of distillable, monomeric isocyanates A) has dropped to less than. 0.5 wt %, based on the weight of the total mixture.

10. The polysiocyante of claim 9 wherein component A) consists of 2,4-diisocyanatotoluene.

11. The polyisocyante of claim 9 wherein component B) is used in an amount of 30 to 300 parts by weight.

12. The polyisocyante of claim 10 wherein component B) is used in an amount of 30 to 300 parts by weight.

13. The polyisocyanate of claim 9 which comprises conducting the trimerization reaction in the absence of solvents D).

14. The polyisocyanate of claim 10 which comprises conducting the trimerization reaction in the absence of solvents D).

15. The polyisocyanate of claim 11 which comprises conducting the trimerization reaction in the absence of solvents D).

16. The polyisocyanate of claim 12 which comprises conducting the trimerization reaction in the absence of solvents D).

17. A coating composition containing a binder which comprises the lacquer polyisocyanate having aliphatically and aromatically bound isocyanate groups of claim 9.

18. A coating composition containing a two-component binder which comprises the lacquer polyisocyanate having aliphatically and aromatically bound isocyanate groups of claim 9 and a polyhydroxyl compound.

* * * * *